No. 636,307. Patented Nov. 7, 1899.
E. WILLBRANDT.
SURGICAL HEATING APPARATUS.
(Application filed May 27, 1898.)
(No Model.) 2 Sheets—Sheet 1.

Witnesses.
Chas. E. Wise
Chas W. Buhler

Inventor.
Emil Willbrandt
by Cann & Cann, Attys

No. 636,307. Patented Nov. 7, 1899.
E. WILLBRANDT.
SURGICAL HEATING APPARATUS.
(Application filed May 27, 1898.)
(No Model.) 2 Sheets—Sheet 2.

Attest:
Chas. E. Wise
John B. Rurio

Inventor:
Emil Willbrandt
by Carr & Carr, Atty's.

THE NORRIS PETERS CO., PHOTO-LITHO., WASHINGTON, D. C.

UNITED STATES PATENT OFFICE.

EMIL WILLBRANDT, OF ST. LOUIS, MISSOURI.

SURGICAL HEATING APPARATUS.

SPECIFICATION forming part of Letters Patent No. 636,307, dated November 7, 1899.

Application filed May 27, 1898. Serial No. 681,913. (No model.)

*To all whom it may concern:*

Be it known that I, EMIL WILLBRANDT, a citizen of the United States of America, residing in the city of St. Louis and State of Missouri, have invented a new and useful Surgical Heating Apparatus, of which the following is a specification.

The object of my invention is to provide a heater or oven for heating limbs or other limited portions of the human body; and it consists in an oven so mounted on its supports that it may be shifted to suit the position of the patient.

It further consists in the parts and in the arrangements and combinations of parts hereinafter described and claimed.

Figure 1:
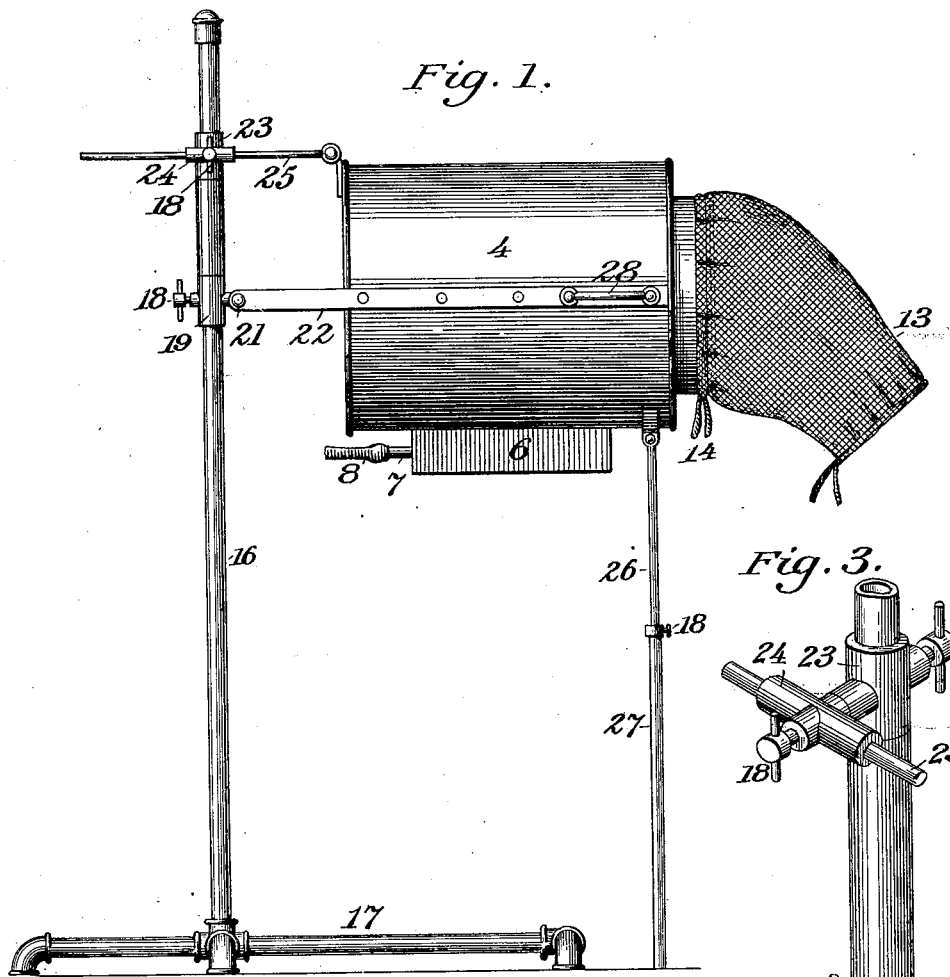
Figure 3:
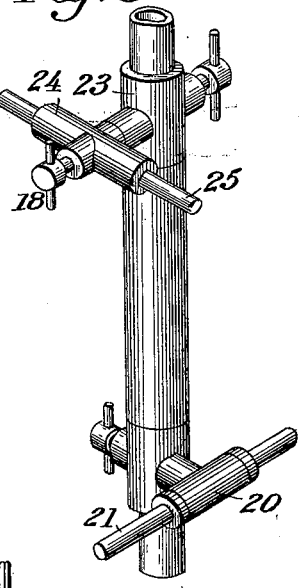
Figure 2:
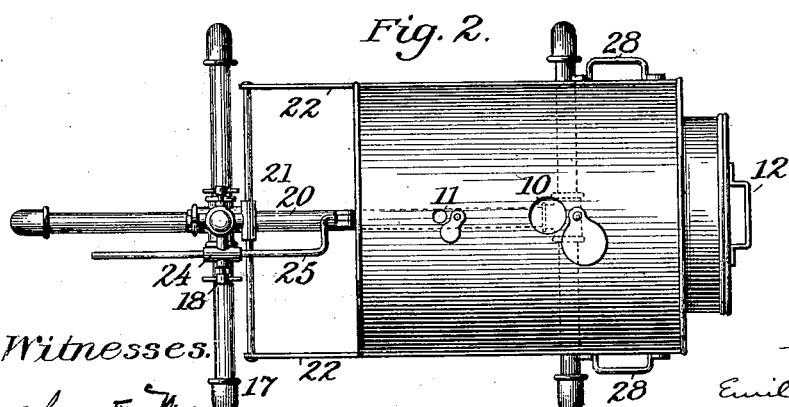
Figure 4:
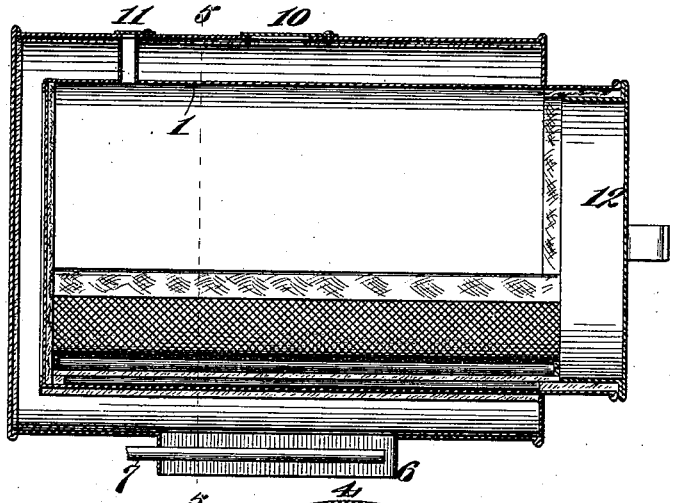
Figure 5:
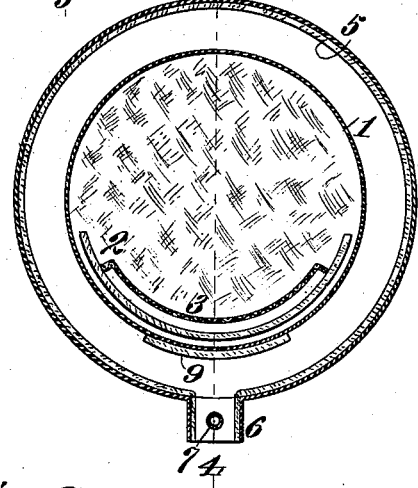
Figure 7:
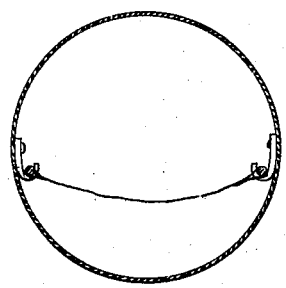
Figure 8:
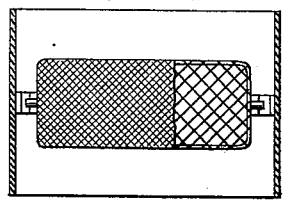
Figure 6:
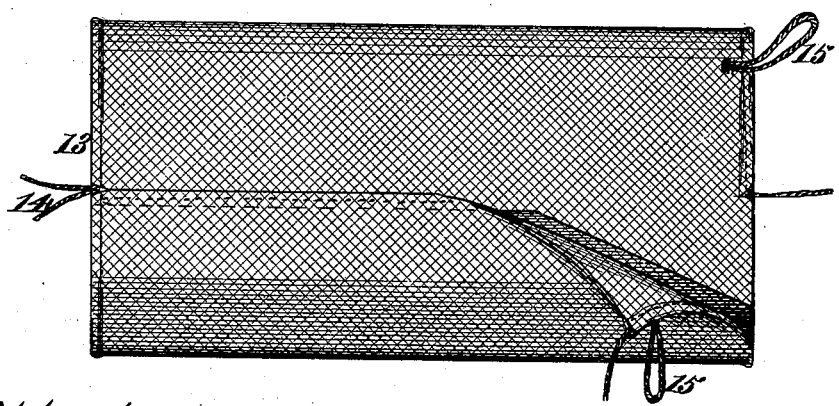

In the accompanying drawings, which form part of this specification, Figure 1 is a side elevation of my device. Fig. 2 is a plan thereof. Fig. 3 is an enlarged detail view of the adjusting devices. Fig. 4 is a vertical longitudinal section of the oven on the line 4 4 of Fig. 5. Fig. 5 is a vertical cross-section thereof on the line 5 5 of Fig. 4. Fig. 6 is an enlarged view of the flexible extension-sleeve. Fig. 7 is a vertical sectional view of the inner shell with the modified shelf or rest. Fig. 8 is a detail longitudinal section of the inner shell, showing a further modified form of shelf or rest.

Like symbols refer to like parts wherever they occur in the drawings.

My oven consists of two metallic shells arranged one inside of the other to form hollow walls. The inner shell 1 is closed at one end and has an opening for the door at the other end. The bottom of the inner shell has, preferably, a raised protecting-lining 2 of asbestos or other material of low conductivity, and raised above this lining, with an air-space intervening, is a shelf or rest of wire-cloth 3. The outer shell 4 incloses all of the inner shell except the front open end thereof and is lined with asbestos 5 or other material of low conductivity. The bottom of the outer shell has an elongated opening bordered by downwardly-extending flanges 6, forming a flue. Inside of the flue thus formed is a perforated pipe 7, connected by a flexible tube 8 to a fuel-supply and constituting a gas or vapor burner. The outside of the inner shell immediately above the burner is covered with asbestos or some other protective lining 9. In the top of the outer shell are a draft-opening and a damper 10 therefor. A like vent and a damper 11 therefor are provided for the inner shell.

The oven is provided with a removable door or cover 12 for the front opening. The edge of the projecting end of the inner shell of the oven is flanged or beaded to prevent the pulling off of a curtain or sleeve 13 of flexible fabric of low conductivity and as nearly impervious to air as practicable. This sleeve is provided at one end with a draw-string 14 or similar device adapted to bind it firmly around the projecting end of the inner shell, while its other end has a similar provision for adjusting and binding it around the limb. In case the heat is to be applied to a limited portion of the trunk of the body, the outer end of the flexible sleeve is furnished with loops 15 or other devices designed to coöperate with binding-cords. The sleeve thus, in effect, becomes a part of the oven and controls the area of the heated surface as well when the end of the sleeve is applied to the trunk of the body as when a limb is placed inside thereof.

The support for the oven consists of a vertical standard 16, mounted on a long broad base 17, low enough to reach under an ordinary bed, while the standard is at the side of the bed. The vertical standard is furnished with one or more sliding collars, each provided with a set-screw 18 for securing it wherever adjusted. The lower collar 19 carries a horizontal sleeve 20, in which is journaled a cross-bar 21, to which are fastened the rearwardly-extending ends of two bars 22, fixed lengthwise to the sides of the oven. The upper collar 23 (which may be integral with the lower collar) is provided with a swivel-sleeve 24, through which works a rod 25, pivotally connected to the top of the oven, said swivel being provided with a set-screw 18 for holding the rods wherever adjusted. The front portion of the oven is also supported by a rod 26, pivotally fastened thereto and telescoping in a tube 27, provided with a set-screw 18.

The adjusting mechanism operates as follows: When the oven is raised to the desired height by side handles 28, provided for the purpose, the set-screw on the lower collar is tightened to hold the collar in place. Then the oven is tilted into the desired angular position to suit the comfort of the patient, the turning of the swivel-sleeve 24 permitting the necessary movement of the rod therein for the purpose. The set-screw on the swivel-sleeve is then tightened to bind the rod and thereby hold the oven in its tilted position. The front support of the oven may then be adjusted to rest on any convenient base or turned out of the way.

Obviously numerous changes may be made in the details of construction hereinbefore set forth, and I do not wish to be restricted thereto. For instance, any form of burner may be used to suit the character of fuel. The shelf or rest 3 for the limb may consist of a cloth supported on hooks at the sides of the oven, as shown in Fig. 7, or the rest may be a frame located transversely across the door of the oven and having a pintle at each end resting in a support or bearing mounted on the side of the oven-opening, as shown in Fig. 8. This latter construction, which is specially adapted for resting the elbow, has the pintle-bearings mounted on a removable rim adapted to fit in the oven-opening.

What I claim is—

1. A surgical heating apparatus consisting of a broad low base, an upright thereon, a sliding collar vertically adjustable on said upright, a heater pivotally mounted on said collar, a swivel-sleeve vertically movable on said upright and an adjustable rod passing through said sleeve and pivotally connected to said oven, substantially as described.

2. A surgical heating apparatus comprising an outer shell having an opening in its lower side, flanges depending from said opening to form a flue, a damper in the outer shell, an inner shell, a raised protecting-lining in the lower part of the same, a shelf or rest suspended near the front end of the shell above the protective lining with an air-space intervening and a draft-opening or damper extending from the top of the inner shell outside of the apparatus.

EMIL WILLBRANDT.

Witnesses:
CHAS. E. WISE,
JAMES A. CARR.